United States Patent
Hsieh

(10) Patent No.: US 7,486,335 B2
(45) Date of Patent: Feb. 3, 2009

(54) APPARATUS AND METHOD FOR DISPLAYING AND CONTROLLING AN ANNULARITY-TYPE OSD MENU IN AN IMAGE DISPLAY DEVICE

(75) Inventor: Kuan-Hong Hsieh, Tu-Cheng (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 583 days.

(21) Appl. No.: 11/153,560

(22) Filed: Jun. 14, 2005

(65) Prior Publication Data

US 2005/0285976 A1    Dec. 29, 2005

Related U.S. Application Data

(63) Continuation-in-part of application No. 11/024,899, filed on Dec. 28, 2004.

(30) Foreign Application Priority Data

Jun. 26, 2004    (CN) ................. 2004 1 0027904

(51) Int. Cl.
    H04N 5/50    (2006.01)
(52) U.S. Cl. ............... 348/569; 715/810; 715/821; 715/822
(58) Field of Classification Search ............... 348/569, 348/570, 563, 564, 734; 715/810, 821, 822, 715/788; 345/184, 169, 172
    See application file for complete search history.

(56) References Cited

U.S. PATENT DOCUMENTS

| | | | |
|---|---|---|---|
| 4,975,689 A * | 12/1990 | Suzuki et al. ............... 345/164 |
| 5,212,553 A | 5/1993 | Maruoka | |
| 5,408,275 A * | 4/1995 | Song et al. ............... 348/734 |
| 5,627,531 A * | 5/1997 | Posso et al. ............... 341/22 |
| 5,673,087 A | 9/1997 | Choi et al. | |
| 6,281,895 B1 * | 8/2001 | Jeong ............... 715/810 |
| 6,348,952 B1 * | 2/2002 | Jeong ............... 348/569 |
| 6,411,337 B2 * | 6/2002 | Cove et al. ............... 348/563 |
| 6,710,771 B1 * | 3/2004 | Yamaguchi et al. ......... 345/184 |
| 2002/0154177 A1 | 10/2002 | Barksdale et al. | |

FOREIGN PATENT DOCUMENTS

CN    1404686 A    3/2003
CN    1129108 C    11/2003

* cited by examiner

*Primary Examiner*—M. Lee
(74) *Attorney, Agent, or Firm*—Morris Manning Martin LLP; Tim Tingkang Xia, Esq.

(57) ABSTRACT

An apparatus for displaying and controlling an annularity-type OSD menu in an image display device includes a key input unit (10), a control unit (11), an OSD menu generation unit (12), a storage unit (13), an image signal output unit (14), a pre-amplifier (15), an image output unit (16), and an image display device (17). The key input unit is for pressing or rotating to output command signals for displaying and controlling function control targets in the annularity-type OSD menu. The control unit is for outputting control signals and control data to display and control the annularity-type OSD menu according to the command signals. Each function control target includes related optional items, and can be expanded into its related optional items at an active area of the image display device. Further, each function control target can be displayed in a different size according to its display position.

19 Claims, 5 Drawing Sheets

APPARATUS AND METHOD FOR DISPLAYING AND CONTROLLING AN ANNULARITY-TYPE OSD MENU IN AN IMAGE DISPLAY DEVICE

CROSS REFERENCE TO RELATED APPLICATION

This application is a continuation-in-part of a U.S. patent application with Ser. No. 11/024,899 filed on Dec. 28, 2004 and entitled "APPRATUS AND METHOD FOR DISPLAYING AND CONTROLLING AN ON-SCREEN DISPLAY MENU IN AN IMAGE DISPLAY DEVICE", which is incorporated herein in its entirety by reference.

BACKGROUND OF THE INVENTION

1. Field of the Invention

The present invention relates to an on-screen display (OSD) apparatus and method, and particularly to an apparatus and method for displaying and controlling an annularity-type OSD menu in an image display device such as a television.

2. General Background

In an image display device such as a television, parameters of the display such as volume, brightness, contrast, horizontal size, horizontal position, vertical size and vertical position can be adjusted by way of an OSD menu. The OSD menu is displayed on the screen of the device. A user can directly select and adjust a desired item shown on the screen, and visually confirm the adjustment.

FIG. 5 schematically illustrates a typical OSD menu displayed on a screen according to the prior art. The OSD menu has a plurality of symbols arranged in an elliptical ring, the symbols representing various parameters that can be adjusted. If a symbol is shaded, this indicates that the symbol has been selected by a user. A rectangular bar in the middle of the OSD menu represents a level meter of a selected parameter. A colored portion of the rectangular bar represents a current level of the parameter. The right side extremity of the colored portion fluctuates from left to right and back again according to adjustments made to the parameter.

The user can press a level increase button or a level decrease button, and thereby adjust the current level. Simultaneously, the user can view the result of the level adjustment on the level meter.

However, the level meter does not indicate exact adjustment values. It is difficult for the user to know the precise variation made by pressing the increase or decrease button. Additionally, all the optional items are simultaneously displayed on the OSD menu with the same size. The user can be confused, at least momentarily, as to which optional item is currently selected.

What is needed, therefore, is an apparatus and method which can display and control an annularity-type OSD menu in an image display device, whereby adjustments to a display parameter are accurately shown to a user, and a display parameter currently selected is readily apparent to the user.

SUMMARY

An apparatus for displaying and controlling an annularity-type OSD menu in an image display device in accordance with a preferred embodiment includes a key input unit, a control unit, an OSD menu generation unit, a storage unit, an image signal output unit, a pre-amplifier, an image output unit, and an image display device. The key input unit is for pressing or rotating to output command signals for displaying and controlling function control targets in the annularity-type OSD menu. The control unit is for outputting control signals and control data to display and control the annularity-type OSD menu on the image display device in accordance with the command signals. The OSD menu generation unit is for receiving the control signals and the control data, and displaying the annularity-type OSD menu.

The storage unit is for storing the control data and configured information of each function control target and related optional items thereof. The image signal output unit is for outputting image signals R, G, B. The pre-amplifier is for converting the image signals and the OSD image signals to predetermined voltages and outputting the resultant values in accordance with a blanking signal BLK. The image output unit is for amplifying and outputting the resultant values. The image display device is for displaying the resultant values received from the image output unit.

Further, a method for displaying and controlling an OSD menu in an image display device is provided. The method includes the steps of: (a) outputting a command signal for displaying the annularity-type OSD menu; (b) displaying the annularity-type OSD menu according to the command signal; (c) determining whether a desired optional item has been selected for adjustment; (d1) determining whether the annularity-type OSD menu is required to be closed, if a desired optional item has not been selected for adjustment; or (d2) displaying the selected optional item in an active area of the image display device, if a desired optional item has been selected for adjustment; (e) determining whether an elapsed period of not receiving any command signals is more than a predetermined threshold period, if the annularity-type OSD menu is not required to be closed; (f) keeping the annularity-type OSD menu displayed, if the elapsed period is not more than the predetermined threshold period; (g) determining whether a configuration value of the selected optional item is required to be adjusted; (h) adjusting the configuration value of the selected optional item and storing the adjusted configuration value, if the configuration value of the selected optional item is required to be adjusted; and (i) determining whether there is a command signal again for displaying the annularity-type OSD menu.

Other advantages and novel features will be drawn from the following detailed description of embodiments with reference to the attached drawings, in which:

DETAILED DESCRIPTION OF THE EMBODIMENTS

Figure 1:
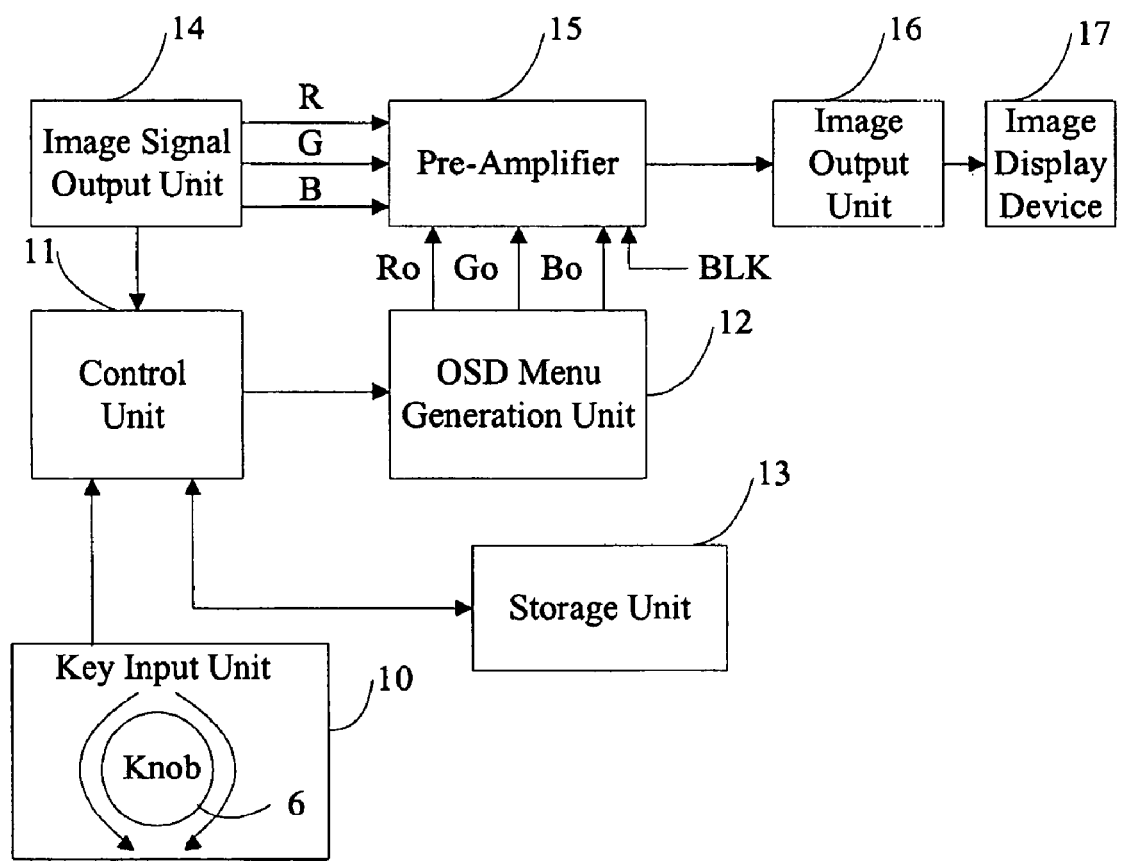
FIG. 1 is a block diagram of hardware infrastructure of an apparatus for controlling and displaying an annularity-type OSD menu in accordance with a preferred embodiment of the present invention.

FIG. 1 is a block diagram of hardware infrastructure of an apparatus for displaying and controlling an annularity-type OSD menu (hereinafter, "the apparatus") in accordance with the preferred embodiment of the present invention. The apparatus includes a key input unit 10, a control unit 11, an OSD menu generation unit 12, a storage unit 13, an image signal output unit 14, a pre-amplifier 15, an image output unit 16, and an image display device 17.

The key input unit 10 outputs command signals for displaying and controlling function control targets in accordance with the manipulation (i.e., rotation or pressing) of a knob 6 thereof by a user. The control unit 11 outputs control signals and control data so as to display and control the annularity-type OSD menu on a display screen of the image display device 17 in accordance with the command signals. The OSD menu generation unit 12 receives the control signals and control data, and outputs OSD image signals $R_0$, $G_0$, $B_0$ corresponding to the respective function control targets, thereby causing the function control targets to be displayed on the screen as an annularity-type OSD menu.

The storage unit 13 stores the control data, and configured information of each function control target and of the related optional items of the function control target. The configured information of each function control target includes position coordinates and corresponding display symbols, so that the size of each function control target is variable in different position coordinates. The configured information of the related optional items includes configuration values, position coordinates, and corresponding display symbols at an active area of the annularity-type OSD menu. The position coordinates indicate different positions through which the function control target or the related optional item is moved.

The image signal output unit 14 outputs image signals R, G, B. The pre-amplifier 15 converts the image signals R, G, B and the OSD image signals $R_0$, $G_0$, $B_0$ into predetermined voltages, and outputs the resultant values in accordance with a blanking signal BLK. The image output unit 16 amplifies and outputs the resultant values. The image display device 17 displays the resultant values obtained from the image output unit 16.

Figure 2:
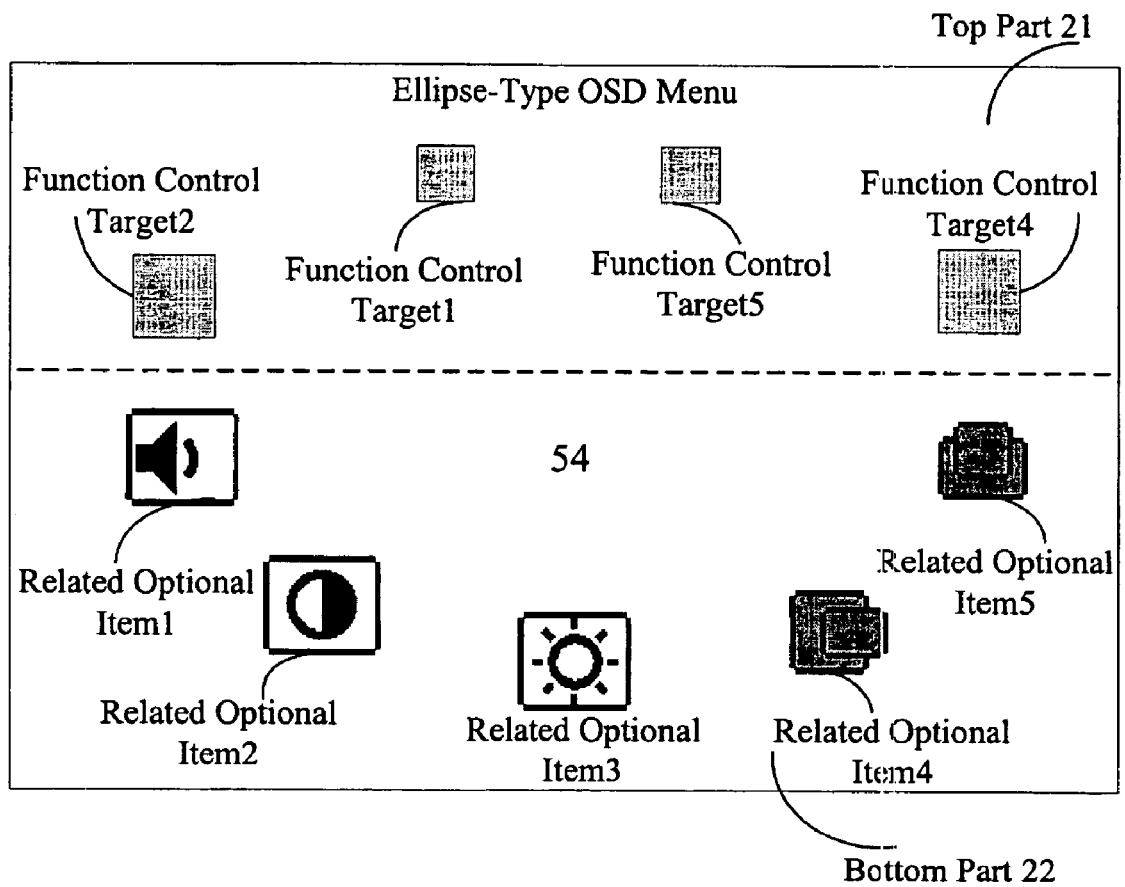
FIG. 2 is a schematic illustration of an ellipse-type OSD menu in accordance with the preferred embodiment of the present invention being displayed on a screen, the ellipse-type OSD menu comprising a plurality of function control targets.

FIG. 2 is a schematic illustration of an ellipse-type OSD menu in accordance with the preferred embodiment of the present invention. However, the ellipse-type OSD menu illustrated and described herein below should not be construed as limiting the invention. The ellipse-type OSD menu is provided by way of example only. In general, an annularity-type OSD menu of the present invention may take any of various suitable forms. For example, the annularity-type OSD menu may take the form of or include an ellipse, an open loop, a closed loop, a circle, a square, a rectangle, a polygon, a wavy outline, and so on. For simplicity and convenience, the following description is with regard to the ellipse-type OSD menu in relation to the preferred embodiment. In the preferred embodiment, the ellipse-type OSD menu includes N function control targets (N being any natural number except 0). Each function control target has a set of related optional items, and may be represented by a particular symbol such as a figure, characters or a figure-character combination. The size of each function control target is variable according to the position of the function control target on the screen. That is, the function control target is displayed in a larger size when its position is at the active area of the screen based on users' selection. In contrast, the function control target is displayed in a smaller size when its position is away from the active area of the screen. Further or alternatively, when the position of a function control target is away from the active area of the screen, the function control target can be displayed in a faint mode. When the function control target is at the active area of the screen, the function control target can be expanded to show its related optional items. The related optional items can each be displayed in a particular mode, such as a flashing mode or a steady mode.

The ellipse-type OSD menu is divided into two parts (as per the broken line shown): a top part 21 and a bottom part 22. The bottom part 22 is the active area, and includes m (m being any natural number except 0) spaces for displaying related optional items of a selected function control target. The related optional item in a middle portion of the bottom part 22 is displayed in the flashing mode, with a corresponding configuration value displayed above the display symbol of said related optional item. The other related optional items in the other portions of the bottom part 22 are displayed in the steady mode. The top part 21 comprises n (n being any natural number except 0) spaces for displaying the other function control targets therein.

If there are any related optional items of the function control target that cannot be shown in the finite space of the bottom part 22, these related optional items are hidden. Similarly, if there are any function control targets that cannot be shown in the finite space of the top part 21, these function control targets are hidden.

In the preferred embodiment, it is assumed that the number of function control targets N is 6, the number of spaces n is 4, and the number of spaces m is 5. Further, it is assumed that the function control targets 1, 2, 4, 5 are in the top part 21, and the function control target 3 is in the bottom part 22 and comprises 5 related optional items. For simplicity, the function control targets 1, 2, 4 and 5 are displayed in the faint mode. Nevertheless, the description should not be construed as limiting the invention to the faint mode.

According to the above description, and referring to FIG. 2, the function control target 3 is expanded into its five related optional items with corresponding display symbols (e.g., Volume1, Contrast2, Brightness3, Horizontal Position4, and Vertical Position5) in the bottom part 22. Brightness3 is in the middle portion of the bottom part 22. The configuration value 54 of Brightness3 is displayed above the display symbol thereof. The function control targets 2 and 4 are displayed in a larger size, and the function control targets 1 and 5 are displayed in a smaller size. The other function control target 6 of the top part 21 is hidden.

Figure 3:
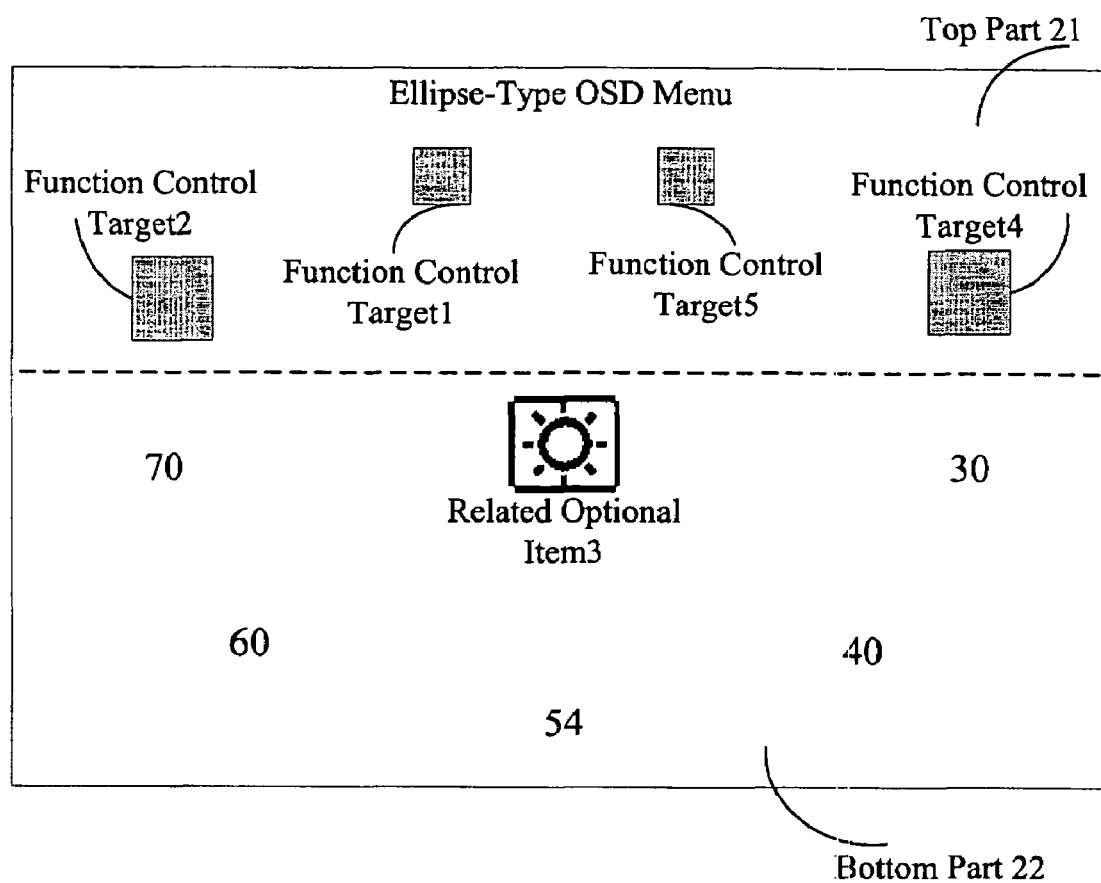
FIG. 3 is similar to of FIG. 2, but showing a configuration value and adjustment graduations of a selected optional item of an expanded function control target of the ellipse-type OSD menu.

FIG. 3 is a schematic illustration of a configuration value and adjustment graduations of a selected optional item of an expanded function control target of the ellipse-type OSD menu. Referring also to FIG. 2, it is assumed that Brightness3 is in the middle portion of the bottom part 22, and that Brightness3 is the desired optional item. When Brightness3 is selected, the ellipse-type OSD menu changes its display to a mode illustrated in FIG. 3. That is, the bottom part 22 displays the configuration value and the adjustment graduations of Brightness3. The display symbol of Brightness3 is above the configuration value.

Figure 4:
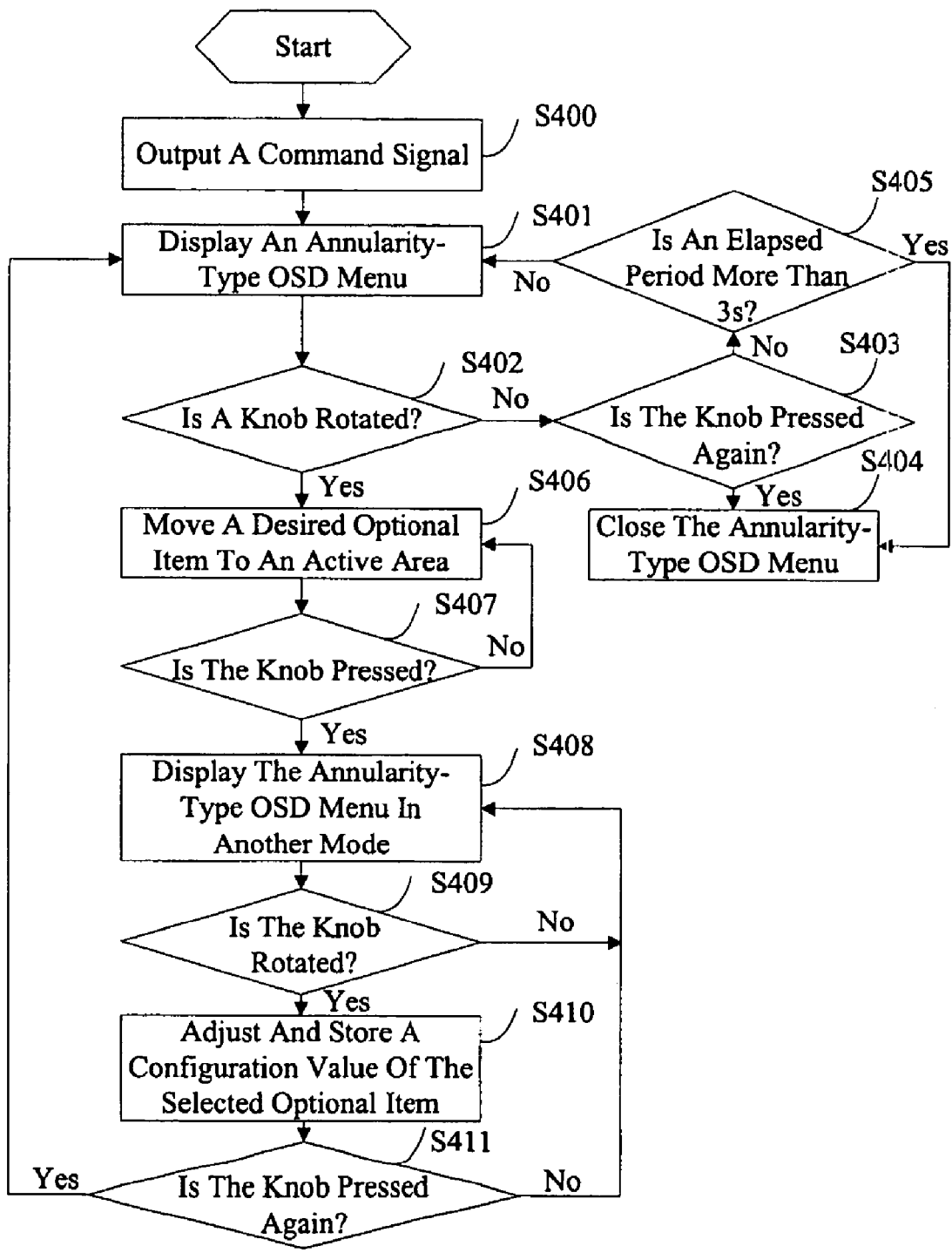
FIG. 4 is a flowchart of a preferred method for controlling and displaying an annularity-type OSD menu in accordance with the present invention.
Figure 5:
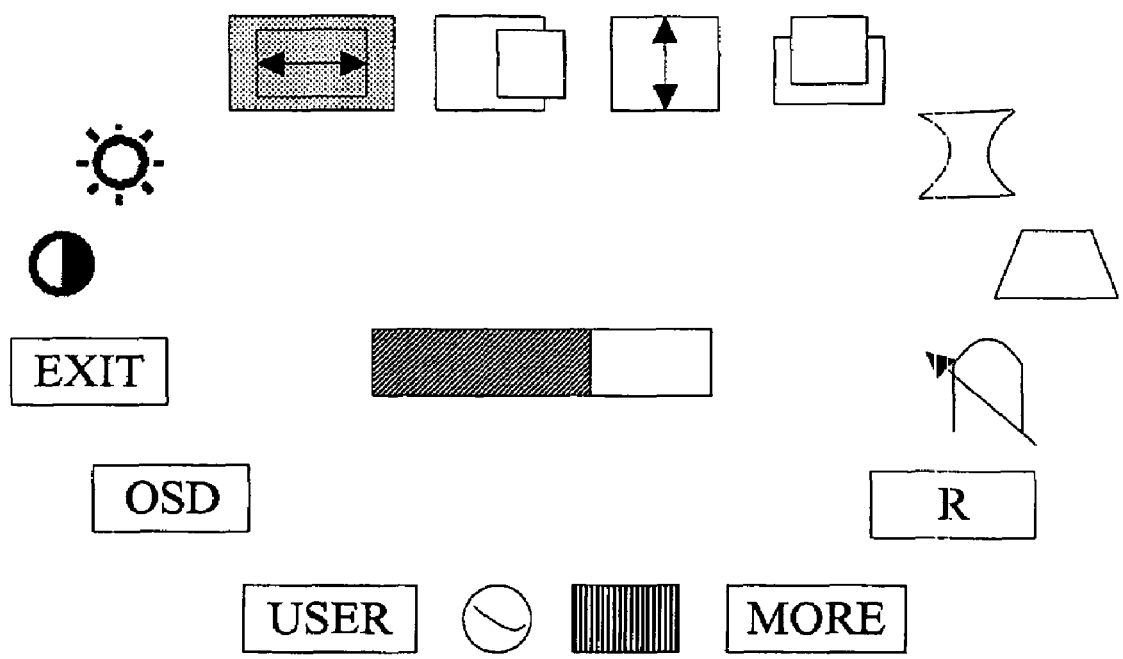
FIG. 5 is a schematic illustration of an OSD menu according to the prior art being displayed on a screen, the OSD menu comprising a plurality of optional items.

FIG. 4 is a flowchart of a preferred method for displaying and controlling an annularity-type OSD menu according to the present invention. In step S400, the knob 6 is pressed and outputs a command signal for displaying the annularity-type OSD menu, such as that shown in FIG. 2. In step S401, the control unit 11 outputs a control signal and control data in accordance with the command signal, and the OSD menu generation unit 12 receives the control signal and the control data and displays the annularity-type OSD menu on the screen of the image display device 17. In step S402, the control unit 11 determines whether the knob 6 has been rotated either clockwise or counterclockwise to select a desired optional item to be adjusted. If the knob 6 has been rotated either clockwise or counterclockwise, the procedure goes to step S406 described below. If the knob 6 has not been rotated, in step S403, the control unit 11 determines whether the knob 6 has been pressed again.

If the knob 6 has been pressed again, in step S404, the annularity-type OSD menu is closed, because the user wants to exit the annularity-type OSD menu. If the knob 6 has not been pressed again, in step S405, the control unit 11 determines whether an elapsed period of not receiving any command signals from the knob 6 is more than 3 seconds. If the elapsed period of not receiving any command signals is more than 3 seconds, the procedure goes to step S404 described above. If the elapsed period of not receiving any command signals is not more than 3 seconds, the procedure returns to step S401 described above.

In step S406, the control unit 11 moves the selected optional item to the middle portion of the bottom part 22. In step S407, the control unit 11 determines whether the knob 6 has been pressed. If the knob 6 has not been pressed, the procedure returns to step S406 described above. If the knob 6 has been pressed, in step S408, the annularity-type menu is displayed in another mode, such as that shown in FIG. 3. In step S409, the control unit 11 determines whether the knob 6 has been rotated either clockwise or counterclockwise to adjust the configuration value of the selected optional item. If the knob 6 has not been rotated, the procedure returns to step S408 described above. If the knob 6 has been rotated, in step S410, the control unit 11 adjusts the configuration value of the selected optional item in the middle portion of the bottom part 22 according to command signals from the knob 6, and stores the adjusted configuration value in the storage unit 13. Then in step S411, the control unit 11 determines whether the knob 6 has been pressed again. If the knob has not been pressed again, the procedure returns to step S408 described above. If the knob has been pressed again, the procedure returns to step S401 described above.

Although the present invention has been specifically described on the basis of a preferred embodiment and preferred method, the invention is not to be construed as being limited thereto. Various changes or modifications may be made to the embodiment and method without departing from the scope and spirit of the invention.

I claim:

1. An apparatus for displaying and controlling an annularity-type on-screen display (OSD) menu in an image display device, the apparatus comprising:
    a key input unit for pressing or rotating by a user in order to output command signals for displaying and controlling function control targets in the annularity-type OSD menu, wherein one of the function control targets is expanded into its one or more related optional items on an active area of the image display device when entering the active area;
    a control unit for outputting control signals and control data to display and control the annularity-type OSD menu according to the command signals;
    an OSD menu generation unit for receiving the control signals and the control data and outputting OSD image signals to display the function control targets and optional items related with one of the function control targets on the annularity-type OSD menu;
    a storage unit for storing the control data and configuration information of the function control targets and related optional items of the function control targets;
    an image signal output unit for outputting second image signals;
    a pre-amplifier for converting the OSD image signals and second image signals to predetermined voltages and outputting resultant values of the conversion;
    an image output unit for amplifying and outputting the resultant values; and
    the image display device, for displaying the resultant values received from the image output unit.

2. The apparatus according to claim 1, wherein each of the function control targets and the related optional items is displayed in a different size according to its display position.

3. The apparatus according to claim 1, wherein the configuration information of the function control targets comprises display symbols of the function control targets, and position coordinates of the function control targets at different display positions.

4. The apparatus according to claim 1, wherein the configuration information of the related optional items comprises configuration values, position coordinates, and display symbols of the related optional items.

5. An electronics-based method for displaying and controlling an annularity-type on-screen display (OSD) menu in an image display device, the method comprising the steps of:
    (a) outputting a command signal for displaying the annularity-type OSD menu;
    (b) displaying function control targets and optional items related with one of the function control targets on the annularity-type OSD menu according to the command signal, wherein the optional items related with one of the function control targets is displayed on an active area of the image display device;
    (c) determining whether a desired optional item has been selected for adjustment; and
    (d) displaying configuration values related with the selected optional item on the active area of the image display device, wherein the function control targets and the configuration information related with the selected optional item are displayed on the annularity-type OSD menu.

6. The method according to claim 5, wherein each of the function control targets is displayed in a different size according to its display position.

7. A method for displaying and controlling an on-screen display (OSD) menu in an image display device, comprising the steps of:
    annularly displaying function control targets of said OSD menu to be displayed and optional items related with one of the function control targets entering an active area of the image display device;
    selecting one optional item of said OSD menu on the active area of said image display device according to a user's selection; and
    annularly displaying function control targets and configuration information related with the selected optional item on the annularity-type OSD menu.

8. The apparatus according to claim 1, wherein any function control target that cannot be shown in an area out of the active area are hidden, any related optional items that cannot be shown in the active area are hidden.

9. The apparatus according to claim 1, wherein the function control target entering the active area is displayed on a first fixed position of the active area with a corresponding display symbol above the related optional items of the function control target.

10. The apparatus according to claim 1, wherein an optional item of the expanded function control target moved on a second fixed position of the active area is a desired optional item to be selected, the selected optional item is expanded into its one or more related configuration information on the active area, the function control targets and the configuration information related with the selected optional item are displayed on the annularity-type OSD menu.

11. The apparatus according to claim 10, wherein the selected optional item of the expanded function control target is displayed on the first fixed position of the active area with a corresponding display symbol above the configuration information related with the selected optional item.

12. The method according to claim 5, further comprising hiding function control targets that cannot be shown in an area out of the active area, and related optional items that cannot be shown in the active area.

13. The method according to claim 5, further comprising displaying the function control target entering the active area on a first fixed position of the active area with a corresponding display symbol above the related optional items of the function control target, and after selecting an optional item, displaying the selected optional item of the expanded function control target on the first fixed position of the active area with a corresponding display symbol above the configuration information related with the selected optional item.

14. The method according to claim 5, further comprising determining whether configuration information related with the selected option item is selected, and saving the selected configuration information.

15. The method according to claim 7, further comprising hiding function control targets that cannot be shown in an area out of the active area, and related optional items that cannot be shown in the active area.

16. The method according to claim 7, further comprising displaying the function control target entering the active area on a first fixed position of the active area with a corresponding display symbol above the related optional items of the function control target.

17. The method according to claim 7, further comprising expanding the selected optional item into its one or more related configuration information on the active area, and after selecting an optional item, displaying the function control targets and the configuration information related with the selected optional item on the annularity-type OSD menu.

18. The method according to claim 7, further comprising displaying the selected optional item of the expanded function control target on the first fixed position of the active area with a corresponding display symbol above the configuration information related with the selected optional item.

19. The method according to claim 7, wherein the function control targets and the related optional items are displayed in a different size according to its display position.

* * * * *